United States Patent [19]

Dolle et al.

[11] Patent Number: 5,962,595
[45] Date of Patent: Oct. 5, 1999

[54] BLEND OF HIGH-MOLECULAR-WEIGHT POLYPROPYLENE AND HIGH-MOLECULAR WEIGHT ETHYLENE-PROPYLENE COPOLYMER WITH BROAD MOLECULAR WEIGHT DISTRIBUTION

[75] Inventors: Volker Dolle, Bensheim; Thomas Böhm, Darmstadt, both of Germany

[73] Assignee: Hoechst Aktiengesellschaft, Germany

[21] Appl. No.: 08/861,592

[22] Filed: May 22, 1997

[30] Foreign Application Priority Data

May 24, 1996 [DE] Germany ............... 196 21 022

[51] Int. Cl.$^6$ ............... C08F 255/04; C08F 4/655; C08F 4/656
[52] U.S. Cl. ............... 525/322; 525/323; 525/249; 525/88; 525/247; 526/124.1; 526/124.5; 526/124.7; 526/125.3; 526/126
[58] Field of Search ............... 525/322, 323, 525/249, 88, 247; 526/125.3, 126, 124.1, 124.7, 124.5

[56] References Cited

U.S. PATENT DOCUMENTS 5,344,885  9/1994  Kersting et al. ............... 525/323
5,536,789  7/1996  Schwager et al. ............... 525/322

FOREIGN PATENT DOCUMENTS

| 0 028 076 | 5/1981 | European Pat. Off. . |
| 0 339 804 | 11/1989 | European Pat. Off. . |
| 2092639 | 11/1993 | European Pat. Off. . |
| 0573862 | 12/1993 | European Pat. Off. . |
| 4019053 | 12/1991 | Germany . |
| WO 91/14718 | 10/1991 | WIPO . |

Primary Examiner—James J. Seidleck
Assistant Examiner—Olga Asinovsky
Attorney, Agent, or Firm—Connolly Bove Lodge & Hutz

[57] ABSTRACT

The invention relates to a high-molecular-weight reactor blend comprising a high-molecular weight polypropylene and a high-molecular weight ethylene-propylene copolymer and having an ethylene content in the range from 0.1 to 2% by weight based on the total amount of blend, a melt flow index MFR (230/5) of $\leq 5$ dg/min and a molecular weight distribution $M_w/M_n$ in the range from 6 to 20.

17 Claims, No Drawings

BLEND OF HIGH-MOLECULAR-WEIGHT POLYPROPYLENE AND HIGH-MOLECULAR WEIGHT ETHYLENE-PROPYLENE COPOLYMER WITH BROAD MOLECULAR WEIGHT DISTRIBUTION

DESCRIPTION

High-molecular-weight ethylene-propylene reactor blend with a broad molecular weight distribution.

The present invention relates to a high-molecular-weight blend comprising ethylene and propylene units and having an ethylene content in the range from 0.2 to 2% by weight.

The invention also relates to a process for preparing these polymers and for producing moldings, such as pipes, fittings, hollow articles, bars and sheets, from the above-mentioned polymers.

DE-A40 19 053 discloses homopolymers with a broad molecular weight distribution. These homopolymers can be converted into with great difficulty, but these pipes have the disadvantage of high brittleness and a rough surface, and therefore have no industrial use.

EP-A-573 862 discloses a process for preparing polypropylene with a molecular weight distribution $M_w/M_n$ of >20 and good processing characteristics. Its melt flow index is 2 dg/min; and its intrinsic viscosity is 280 ml/g. This polypropylene is prepared in a gas-phase polymerization. Examples 1 to 4 of EP-A-573 862 describe the preparation of a homo-PP powder with a broad molecular weight distribution. Although the polydispersity $M_w/M_n$ is not given in any of the examples, the intrinsic viscosities (800 ml/g and 67 ml/g) suggest a very large molecular weight spread in the first and second steps.

The processes known from the prior art (EP-A-573 862) were repeated in order to check the properties of the materials. It was found that all the polymers had high brittleness and modest processing quality, and showed inhomogeneity. The production of PP pipes by a conventional extrusion process was on occasions impossible, because the melt viscosity was insufficient for extrusion.

It was an object of the present invention to find an improved molding composition with which pipes could be produced on conventional production equipment, and which, besides low brittleness and a smooth surface, possesses high toughness and excellent rigidity and creep performance.

This object was achieved by means of a blend of the type described at the outset, the distinguishing features of which are that it has a melt flow index MFR (230/5) of $\leq 5$ dg/min and a molecular weight distribution $M_w/M_n$ in the range from 6 to 20.

It was found, surprisingly, that the novel propylene-ethylene copolymer can be processed on conventional production machinery to give pipes which have smooth finished surfaces, good processing quality, and high strengh together with good hardness and creep performance.

The invention also relates to a process for preparing the propylene-ethylene blend by copolymerization of propylene and ethylene in a first step, and polymerization of propylene or, if desired, copolymerization with another 1-olefin having from 4 to 20 carbon atoms, in suspension and at a temperature in the range from 30 to 150° C., and a pressure of from 10 to 100 bar, and a reaction time of from 30 min to 6 h, in the presence of a commercially-available catalyst (e.g. catalyst FT4S of Montell, Milan, Italy), of an organoaluminum compound (B) and, if desired, of an organosilicon compound (C), in a second step. The distinguishing features of the process are that in the first step the suspension medium is also the monomer, and in this step a copolymer is prepared which has a viscosity of from 500 to 1400 ml/g and forms a proportion of from 20 to 80% of the entire polymer, and that after the second reaction step, the entire polymer has a viscosity of from 200 to 400 ml/g and a polydispersity $M_w/M_n$ of from 6 to 20.

In the first reaction step, a high-molecular-weight ethylene-propylene copolymer is prepared which has a viscosity of from 500 to 1400 ml/g and which forms a proportion of the entire polymer of from 20 to 80% by weight, preferably from 45 to 75% by weight, and particularly preferably from 48 to 65% by weight, whereas in the second reaction step a low-molecular-weight product is prepared which has a viscosity of from 200 to 400 ml/g and forms a proportion of the entire polymer of from 80 to 20% by weight, preferably from 55 to 25% by weight, particularly preferably from 52 to 35% by weight.

The polymerization is carried out in a bulk process in two reaction steps, where the propylene monomer is simultaneously starting material and suspension medium.

The novel process is carried out in a particular embodiment as two-step polymerization preceded by prepolymerization. Both the first and the second reaction step, and the prepolymerization, may be carried out either as a discontinuous or a continuous operation, continuous operation being preferred. Before the prepolymerization, component B and component C are mixed with one another. In the presence of these active components, propylene is prepolymerized in suspension or in bulk. The prepolymerization in the liquid monomer is preferred. The reaction time is from 4 to 10 min, the prepolymerization temperature is in the range from 10 to 25° C.

The prepolymer is then transferred to the first reaction step of the polymerization, and polymerized in liquid propylene at a temperature of from 55 to 100° C., with a reaction time of 0.5 to 3.5 h. A phase ratio is set of from 2.5 to 4 l of liquid propylene per kg of PP, preferably of 3.3 l of liquid propylene per kg of PP. In the first reaction step, ethylene is metered in continuously at a rate which maintains a $C_2$ concentration in the liquid phase of from 0.1 to 2% by weight, preferably from 0.1 to 1.5% by weight. To regulate the molecular weight, hydrogen is metered in.

After the first reaction step, the multiphase system is transferred to the second reaction step and polymerized there at a temperature of from 55 to 100° C. The second reaction step takes place in a second reactor, in which a phase ratio of from 1 to 2.5 l of liquid propylene per kg of PP, preferably of 1.9 l of liquid propylene per kg of PP, is set. According to the invention, it is preferable, in the described process, to set different phase ratios in the two reactors. In the second step, no ethylene is metered in. For molecular weight regulation, hydrogen is metered in also in the second step.

The temperatures and the hydrogen concentrations in the two reactors may be the same or different. The ethylene concentration is different in the two reactors. Suitable reactors are stirred reactors and loop reactors.

It is possible to evaporate the monomer between the two reactors and to meter in the still polymerizationally-active catalyst/PP system into the second reactor. This also makes it possible to set a lower hydrogen concentration in the second reactor than in the first.

Component B is trimethylaluminum, triisobutylaluminum or triethylaluminum, triethylaminum and triisobutylaluminum being preferred, and triethylaluminum being particularly preferred.

Component C is cyclohexylmethyidimethoxysilane, biscyclopentyl-dimethoxysilane or diphenyidimethoxysilane, cyclohexylmethyl-dimethoxysilane and biscyclopentyidimethoxysilane being preferred.

Component B is employed in a concentration of from 0.001 to 10 mmol/l, preferably from 0.1 to 5 mmol/l. Component C is employed in a ratio R to component B. This ratio is calculated as the quotient obtained by dividing the concentration of B by the concentration of C, each in mol/l. The ratio R is from 1 to 200, preferably from 2 to 100, and particularly preferably from 2.5 to 75.

According to the invention, preference is given to products with an MFR (230/5) of from 0.01 to 5 dg/min, those with an MFR (230/5) of from 0.02 to 2 dg/min being particularly preferred. The novel blend consists of from 0.5 to 2% by weight of ethylene units and from 99.5 to 98% by weight of propylene units.

After the second reaction step, the mixture of propylene, hydrogen, and ethylene if present, is worked up. Fast evaporation of the liquid monomer in one step is preferable. The purified copolymer is then dried in an inert gas stream, and it is ensured that the copolymer is free from monomer. The resultant high-molecular-weight copolymer is mixed with stabilizers, lubricants, fillers, pigments etc., and granulated using an extruder or compounder.

The evaporated monomer mixture is condensed and separated by distillation into propylene, ethylene if present, and hydrogen. The distillation should be arranged so that a hydrogen concentration of <150 ppm, particularly preferably <40 ppm, is ensured. The monomer purified in this way is then metered back into the first reactor.

The following Examples illustrate the invention. The following polymer analysis methods were used to characterize the products which were prepared:

| | |
|---|---|
| Melt flow index MFR (230/5) | according to DIN 53735 |
| Viscosity number [ml/g] | determined at 135° C. in decalin |
| Creep | according to DIN 53759 |
| Impact strength | according to DIN 8078 |
| Ratio $M_w/M_n$ | by gel permeation chromatography in orthodichlorobenzene at 135° C. on a Waters 150C chromatograph. |

EXAMPLE 1

Continuous polymerization is carried out in two 16 l reaction vessels arranged in series. Both reactors are provided with 10 l of liquid propylene. Cocatalyst B is triethylaluminum in 1 mmol/l concentration; the stereoregulator C is cyclohexylmethyldimethoxysilane in 0.1 mmol/l concentration. The hydrogen concentration in the liquid phase is set at 40 ppm by volume.

In the first reactor, a mixture of propylene and ethylene is polymerized at 70° C. in the presence of the Montell FT4S catalyst. Catalyst, cocatalyst, ethylene, propylene and hydrogen are continuously replenished. 3.8 g of ethylene are metered in per kg of propylene. The polymerization is continued as far as a solids content of 224 g of PP per liter of suspension, with gives a phase ratio of 3.3 l of liquid propylene per kg of PP. Hydrogen is replenished at a rate which maintains a concentration of 40 ppm in the liquid phase.

The copolymer obtained in the first reactor is transferred together with the catalyst into the second reactor, into which hydrogen and propylene are then metered. The hydrogen concentration in the liquid phase is 420 ppm by volume. The reaction temperature in the second reactor, as in the first, is 70° C. The polymerization is continued as far as a solids content of 324 g of PP per liter of suspension, giving a phase ratio of 1.9 l of liquid propylene per kg of PP.

The catalyst yield, calculated after isolating the polymer from the second reactor as powder, is 16 kg of PP/g of catalyst. Measurements showed a molecular weight distribution $M_w/M_n$ of 9.0, an MFR of 0.8 dg/min and a viscosity number of 570 ml/g. IR spectroscopic measurements showed 0.5% by weight of $C_2$ units. The proportion which is soluble in cold xylene is measured as 3.3% by weight.

COMPARATIVE EXAMPLE 1

The procedure was as in Example 1, but the phase ratio was set to the same value in reactor 1 and reactor 2, and the same hydrogen concentration was set in both reactors. Ethylene was not metered in to either reactor. An $M_w/M_n$ value of 4.0 was determined.

EXAMPLE 2

The powder obtained from Example 1 was granulated under inert gas in a twin-screw extruder with a screw diameter of 53 mm at about 240° C., 0.15% of ®Irganox 1010 and 0.15% of ®Hostanox PAR 24 being added as stabilizers. A colorant mixture was also added. The $M_w/M_n$ value determined for the resultant granules was 8.0.

EXAMPLE 3

The granules from Example 2 were converted on a pipe extrusion unit with a 60 mm grooved-barrel extruder and a vacuum spray tank, giving pipes of dimensions 32×4.5 mm (internal diameter =32 mm, wall thickness =4.5 mm). The throughput rate was 150 kg/h, and the melt temperature was set at 210° C.

It was established that the processing ran without difficulty and that both the internal and external pipe surfaces were very smooth. The pipe surface was characterized by comparison with pipes produced from granules with narrow molecular weight distribution (see Comparative Example 1, $M_w/M_n$=4) using the same pipe extrusion unit under the same conditions. Pipes produced from the granules of Example 2 satisfied the requirements of DIN 8078 (General Quality Requirements and Testing) with respect to the flexural impact test and the creep rupture strength test.

| Test temperature | Test stress | Minimum time-to-failure according to DIN 8078 | Measured time-to-failure |
|---|---|---|---|
| 95° C. | 3.5 N/mm$^2$ | >1000 h | >1200 h |
| 120° C. | 3.0 N/mm$^2$ | >200 h | >250 h |

The creep rupture strength tests were carried out according to DIN 8078 (95° C., a 3.5 N/mm$^2$) and with reference to DIN 8078 (120° C., a 3.0 N/mm$^2$). The pipes produced from the granules of Example 2 exceeded the required minimum times-to-failure of DIN 8078, as can be seen from the values given above, and had surfaces of excellent quality. The pipes produced for comparison using granules from Comparative Example 1 failed in the creep rupture strength test.

EXAMPLE 4

Propylene is polymerized to PP in a pilot polymerization plant. The catalyst (FT4S from Montell), triethylaluminum and cyclohexylmethyidimethoxysilane are mixed with one another, and prepolymerization is carried out continuously in liquid propylene in the prepolymerization reactor. The mixture of catalyst, triethylaluminum, cyclohexylmethyidimethoxysilane, propylene and polypropylene is metered into the first reactor. Propylene is additionally added to the first reactor via a storage vessel. Hydrogen and ethylene are dissolved in the liquid propylene and are metered into the reactor via this stream. A concentration of 40 ppm of hydrogen in the liquid propylene is set. 17 metric tons per hour of propylene are supplied in the first reactor, and 1.8 kg of ethylene per metric ton of propylene is metered in. In the reactor, propylene is converted to PP in the presence of the FT4S catalyst. The reaction mixture is continuously removed from the first reactor and metered into the second reactor. A further 7 metric tons per hour of propylene are metered into the second reactor. In this propylene stream, a hydrogen concentration of 420 ppm is set. No ethylene is metered into the second reactor. After passing through the second reactor, the reaction mixture is worked up in a flash-distillation vessel, by reducing the pressure to 18 bar, and the PP is separated from the gaseous components. The gaseous propylene is condensed, distilled and then conducted back to the storage tank. 0.9 mmol of Al, 0.18 mmol of donor and 5 mmol of catalyst (measured as mmol of Ti) are metered in per liter of liquid propylene metered into the first reactor.

In the first reactor, a phase ratio of 3.3 l of liquid propylene per kg of PP is set; in the second reactor, this ratio is set at 1.9 l of liquid propylene per kg of PP. The amounts of heat extracted from the reactors were in the ratio 1.4:1(1st reactor:2nd reactor). The resultant PP product has a polydispersity $M_w/M_n$ of 7.0.

COMPARATIVE EXAMPLE 2

The procedure of Example 4 was followed, but a phase ratio of 3.3 l of liquid propylene per kg of PP was set in both the first and the second reactors. The amounts of heat extracted from the two reactors were in the ratio of 3.4:1 (1st reactor:2nd reactor).

The resultant PP product has a polydispersity $M_w/M_n$ of 4.8. The PP powder obtained in this manner was granulated as in Example 2, pipes were produced from the granulate as in Example 3 and were subjected to a pipe creep test as in Example 3. The pipes have a very rough surface and do not fulfil the requirements of section 3.5 of DIN 8078. The pipes were subjected to various creep tests corresponding to DIN 53759: the required values were not achieved.

EXAMPLE 5

The procedure of Example 4 was followed, but dicyclopentyldimethoxy-silane was used as stereoregulator at a concentration of 0.036 mmol of dicyclopentyidimethoxysilane per l of liquid propylene. 40 ppm of hydrogen were metered into the first reactor. In the gas stream entering the second reactor, a concentration of 3500 molar ppm of hydrogen was set. The catalyst yield achieved was 20 kg pf PP/g of catalyst. The end product had a molecular weight distribution $M_w/M_n$ of 10.5 and an MFR (230/5) of 0.8 dg/min. 1.8 kg of ethylene were metered into the first reactor per tonne of propylene.

Granulation and pipe production were carried out as in Examples 2 and 3. In the pipe test, the requirements of section 3.5 of DIN 8078 were satisfied. The pipes were subjected to various creep performance tests corresponding to DIN 53759:

The requirements of DIN 8078 (creep rupture strength and flexural impact test on the pipe) were satisfied.

| Test temperature | Test stress | Minimum time-to-failure according to DIN 8078 | Measured time-to-failure |
|---|---|---|---|
| 95° C. | 3.5 N/mm² | >1000 h | >2000 h |
| 120° C. | 3.0 N/mm² | >200 h | >320 h |

The minimum times-to-failure for PP-R pipes required in DIN 8078 were significantly exceeded. The pipes have very good creep rupture strength and extremely smooth surfaces.

EXAMPLE 6

The procedure of Example 4 was followed, but diphenyidimethoxysilane was used as stereoregulator. An $M_w/M_n$ value of 6.1 was measured for the powder. The DIN creep test was passed and the pipe surface was smooth.

We claim:
1. A two-step polymerization process for preparing a propylene-ethylene blend by copolymerization of propylene and ethylene in a liquid propylene medium in a first step preceded by prepolymerization and polymerization of propylene or in a liquid propylene medium copolymerization with another 1-olefin having from 4 to 20 carbon atoms, in suspension and at a temperature in the range from 30 to 1500° C., and a pressure of from 10 to 100 bar, and with a reaction time of from 30 min to 6 h, in the presence of a catalyst, of an organoaluminum compound (B) and of an organosilicon compound (C), in a second step, wherein, in the first step, the suspension medium is also the monomer, and an ethylene-propylene copolymer is prepared in the first step having a viscosity of from 500 to 1400 ml/g and forms a proportion of from 20 to 80% of the entire polymer, and wherein, after the second reaction step, the entire polymer has a viscosity of from 200 to 400 ml/g of a polydispersity $M_w/M_n$ of from 6 to 20.

2. The process as claimed in claim 1, wherein, in the first reaction step, a copolymer of propylene and ethylene is prepared which forms a proportion by weight of from 45 to 75% by weight of the entire polymer.

3. The process as claimed in claim 1, wherein, in the second reaction step, a low-molecular-weight polypropylene is prepared having a viscosity of from 200 to 400 ml/g and forming a proportion of from 55 to 25% by weight of the entire polymer.

4. The process as claimed in claim 1, wherein, in the second reaction step, a low-molecular-weight polypropylene is prepared having a viscosity of from 200 to 400 ml/g and forming a proportion of from 52 to 35% by weight of the entire polymer.

5. The process as claimed in claim 1, wherein a prepolymerization is carried out, where component B and component C are mixed with one another before the prepolymerization and are then brought into contact with the catalyst, and where propylene is prepolymerized in the presence of these active components and in suspension, with a reaction time of from 4 to 15 min, and at a temperature in the range from 10 to 25° C.

6. The process as claimed in claim 1, wherein, in the first reaction step, the polymerization is carried out in liquid propylene at a temperature of from 55 to 100° C. during a reaction time period of from 0.5 to 3.5 h.

7. The process as claimed in claim 1, wherein, in the first reaction step, a phase ratio in the range from 2.5 to 4 l of liquid propylene per kg of PP is set.

8. The process as claimed in claim 1, wherein, in the first reaction step, an ethylene concentration in the liquid phase of from 0.1 to 2% by weight is set.

9. The process as claimed in claim 1, wherein, in the second reaction step, the polymerization is carried out at a temperature in the range of from 55 to 100° C. and wherein a phase ratio is set of from 1 to 2.5 l of liquid propylene per kg of PP.

10. The process as claimed in claim 9, wherein different phase ratios are set in the first and in the second reaction step.

11. The process as claimed in claim 1, wherein trimethylaluminum, triisobutylaluminum or triethylaluminum is employed as component B.

12. The process as claimed in claim 1, wherein cyclohexylmethyldimethoxysilane, biscyclopentyidimethoxysilane or diphenyldimethoxysilane is employed as component C.

13. The process as claimed in claim 1, wherein component B is employed in a concentration of from 0.001 to 10 mmol/l.

14. The process as claimed in claim 13, wherein the concentration is in the range of from 0.1 to 5 mmol/l.

15. The process as claimed in claim 1, wherein component C is employed in a ratio R to component B which is calculated as the quotient obtained by dividing the concentration of B by the concentration of C, each in mol/l, and which is in the range of from 1 to 200.

16. The process as claimed in claim 15, wherein the ratio R is in the range of from 2 to 100.

17. The process as claimed in claim 16, wherein the ratio R is in the range of from 2.5 to75.

* * * * *

UNITED STATES PATENT AND TRADEMARK OFFICE
CERTIFICATE OF CORRECTION

PATENT NO. : 5,962,595
DATED : October 5, 1999
INVENTOR(S) : Volker Dolle et al.

It is certified that error appears in the above-identified patent and that said Letters Patent is hereby corrected as shown below:

Cover page, in the ABSTRACT, line 1, "high-molecular-weight reactor" should be deleted.

Column 6, line 16, "diphenyi-" should read -- diphenyl --; line 28, "1500°" should read -- 150° --.

Column 6, line 22 (claim 1, line 2), after "blend" insert -- of a high-molar-weight polypropylene and a high-molecular-weight ethylene-propylene copolymer, said blend having an ethylene content in the range from 0.1 to 2% by weight, based on the total amount of the blend and a melt flow index MFR (230/5) of ≤ 5 dg/min, --.

Column 7, line 16 (claim 12, line 2), "biscyclopentyi" should read -- biscyclopentyl --.

Column 8, line 14 (claim 17, line 1), "16" should read -- 15 --.

Signed and Sealed this

Eleventh Day of April, 2000

Attest:

Q. TODD DICKINSON

Attesting Officer

Director of Patents and Trademarks